Patented Aug. 14, 1945

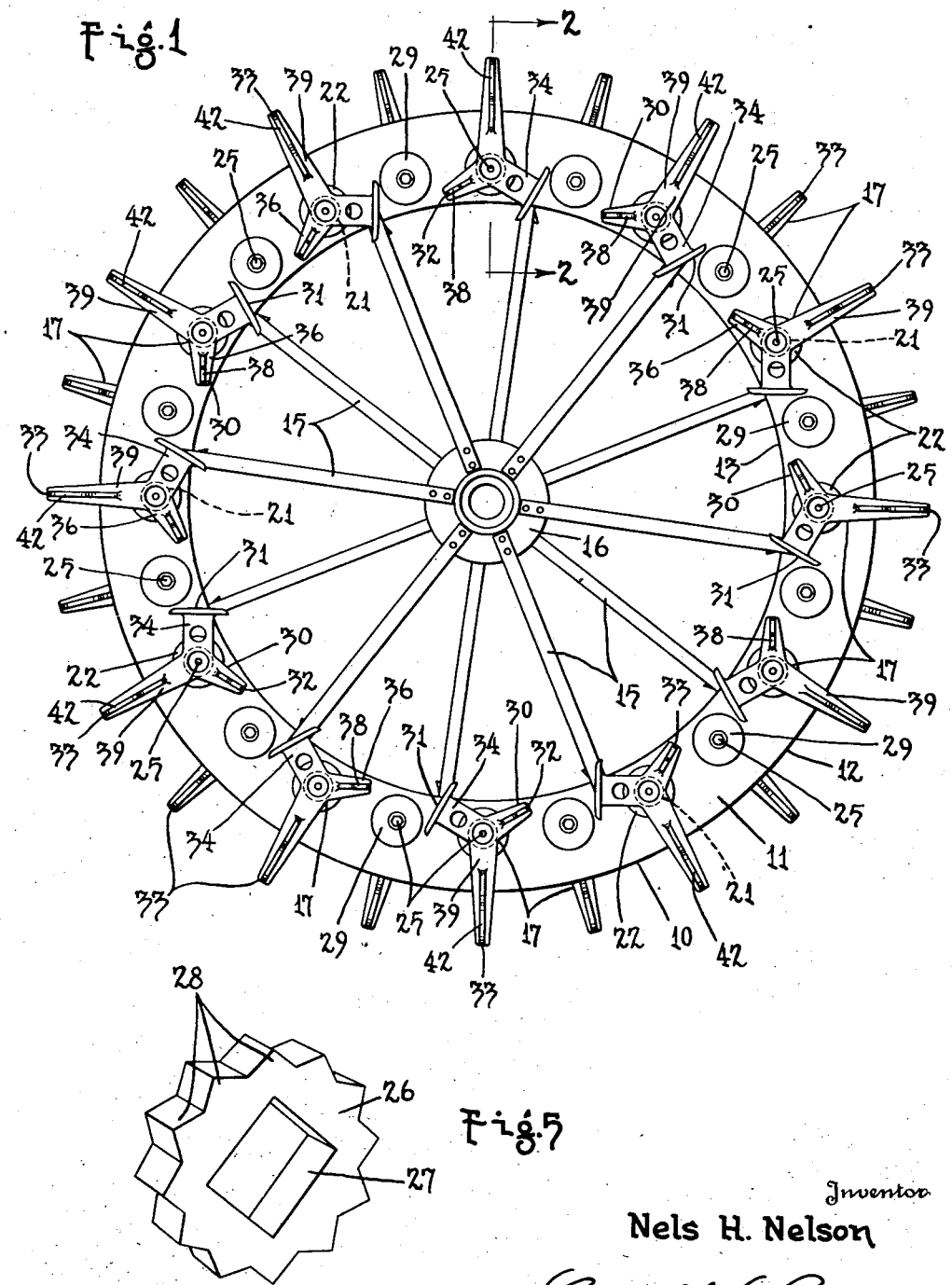

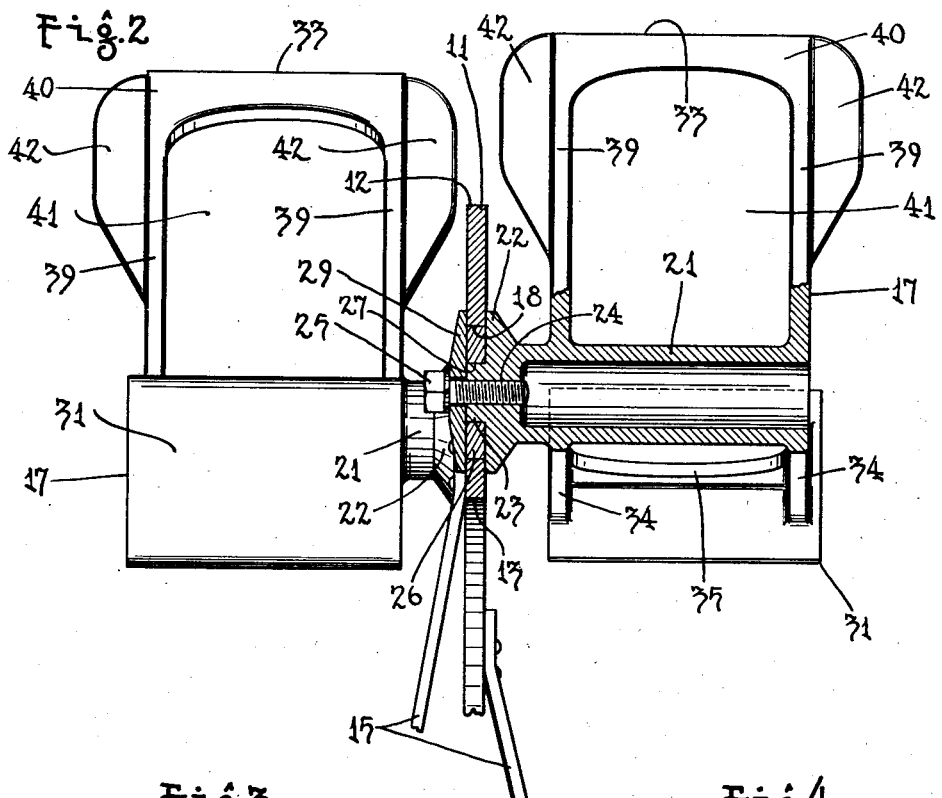

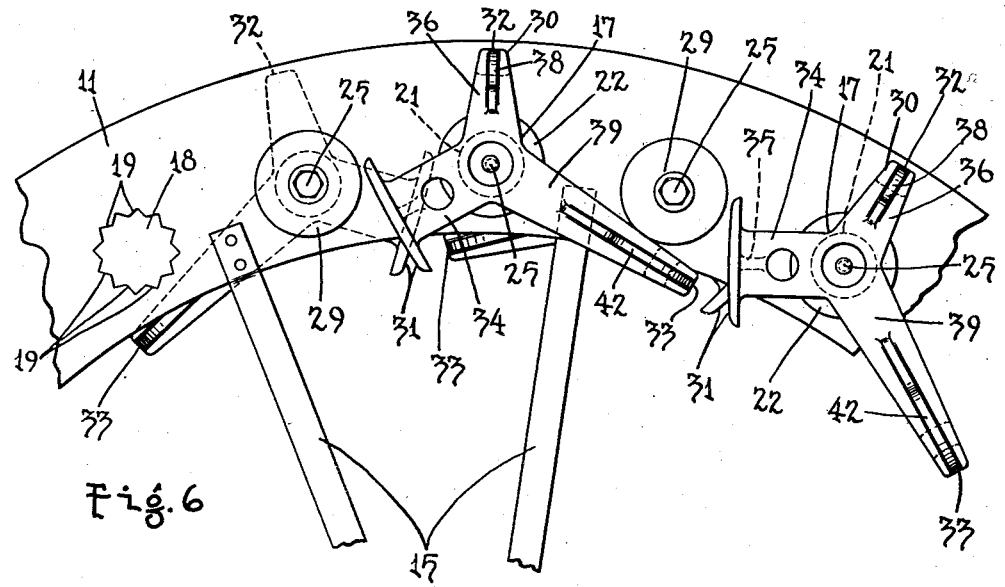
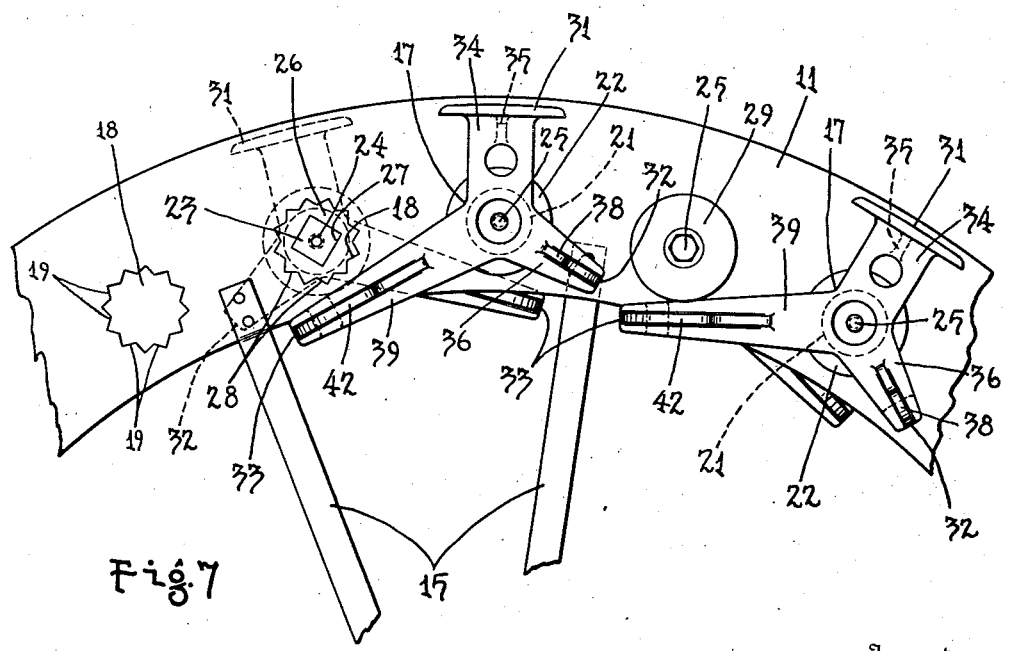
Inventor
Nels H. Nelson

2,382,090

UNITED STATES PATENT OFFICE 2,382,090

TRACTION WHEEL

Nels H. Nelson, Minneapolis, Minn.

Application November 6, 1942, Serial No. 464,765

7 Claims. (Cl. 301—50)

My invention relates to traction wheels and particularly to lugs for use in conjunction therewith, and has for an object to provide a construction capable of use for varying ground conditions.

An object of the invention resides in providing a lug having three or more ground-engaging members.

An object of the invention resides in constructing one of said ground-engaging members in the form of a shoe adapted to ride upon the surface of the ground and at least two of said ground-engaging members in the form of blades adapted to penetrate the ground.

A still further object of the invention resides in constructing one of said blades of a radial extent greater than the other to procure different degrees of penetration of the blade into the ground.

An object of the invention resides in constructing the blades with narrow ground-engaging members and with arms connected thereto and forming openings through the blade for preventing adherence of the earth to the blade when the blade leaves the ground.

Another object of the invention resides in providing a construction for attaching the lug to the rim of the wheel with any of the ground-engaging members thereof projecting outwardly from the wheel.

A still further object of the invention resides in constructing the lug with a hub to which ground-engaging members are connected.

An object of the invention resides in providing a stud on the hub having one or more projections thereon and in further providing a key having an opening therein adapted to receive the stud and formed with projections thereon cooperating with the projections of the stud.

Another object of the invention resides in constructing the key with a plurality of symmetrically arranged projections thereon and in constructing the rim with an opening, the marginal portion of the rim about the opening being formed with projections adapted to cooperate with the projections of the key to permit of assembly of the lug with reference to the rim, so that any of the ground-engaging members may be disposed outwardly.

A feature of the invention resides in providing in the rim and key a number of projections which is a multiple of the number of ground-engaging members, so that each ground-engaging member may be arranged in a number of angular positions relative to the rim.

Another object of the invention resides in providing a lug which will be inexpensive in construction and highly serviceable.

A feature of the invention resides in providing a lug which can be readily replaced at a minimum expense.

Other objects of the invention reside in the novel combination and arrangement of parts and in the details of construction hereinafter illustrated and/or described.

In the drawings:

Fig. 1 is an elevational view of a traction wheel illustrating an embodiment of my invention.

Fig. 2 is a fragmentary elevational sectional view taken on line 2—2 of Fig. 1 and drawn to a greater scale.

Fig. 3 is a plan view of one of the lugs detached from the traction wheel.

Fig. 4 is an elevational sectional view taken on line 4—4 of Fig. 3.

Fig. 5 is a perspective view of one of the keys used with the invention.

Fig. 6 is an elevational view of a portion of the wheel shown in Fig. 1 drawn to a somewhat greater scale and showing the lugs in different positions.

Fig. 7 is a view similar to Fig. 6 showing the lugs arranged in still different positions.

In the use of tractors, different types of lugs are employed for the traction wheels, depending upon the condition of the ground. The present invention utilizes a single lug having a number of ground-engaging members thereon which may be attached to the wheel in a manner such as to present any of the ground-engaging members for action.

For the purpose of illustrating my invention, I have shown in the drawings a traction wheel indicated in its entirety by the reference numeral 10. This traction wheel comprises a rim 11 which is plate-like in form, being constructed from a sheet of heavy plate metal to provide a circular outermost edge 12 and a corresponding inner edge 13, making the rim in the form of an annulus. The rim 11 has attached to it a number of spokes 15 which are secured to a hub 16. The hub 16 may be of any suitable construction and, not forming any particular feature of the instant invention, has not been shown in detail.

For use in conjunction with the rim 11, a number of lugs 17 are employed, one of which is shown in detail in Figs. 2, 3 and 4. Since all of the lugs are identical in construction, only one thereof will be described.

At the locality where each of the lugs 17 is attached to the rim 11, the said rim is constructed with an opening 18 best shown in Figs. 6 and 7. The marginal portion of the rim 11 about the opening 18 is constructed with a number of symmetrically disposed projections 19 which may be of any suitable shape. In the instant case, these projections are illustrated as being in the form of serrations or V-shaped projections. The said projections are equally spaced and arranged in the form of a circle.

The lug 17 shown in Figs. 1, 2, 3 and 4 consists of a hub 21 which is preferably tubular in form and is constructed at one end with a flange 22. At this end of the hub a stud 23 is provided, best shown in Fig. 7, which is square or rectangular in form and which is of a depth slightly less than the thickness of the rim 11. The stud 23 is threaded as indicated at 24 in Fig. 4, to receive a cap-screw 25.

Operating in conjunction with the stud 23 is a key 26 shown in detail in Fig. 5. The key 26 is constructed with a square hole 27 adapted to receive the stud 23. The stud 23 fits snugly within the hole 27 and relative rotation between the stud and key is prevented by means of the form of the same. The key 26 is adapted to be received within the opening 18 of rim 11 and is constructed with a number of projections 28 which intermesh with the projections 19 and prevent relative rotation between the key and rim. The number of projections is a multiple of the number of ground-engaging members of the lug 17 and permits of assembly of the lug with any of the ground-engaging members outermost and at different angular positions relative to the rim. The lug 17 is attached to the rim 11 by means of the cap-screw 25 which passes through a washer 29 overlying the rim 11 on the side thereof opposite to that engaged by the flange 22. When the cap-screw 25 is tightened, the lug 17 is firmly attached to the rim.

The lug 17 comprises three ground-engaging members 31, 32 and 33 which are carried by the hub 21 and are arranged angularly about the same, said ground-engaging members being spaced 120° apart.

The ground-engaging member 31 is constructed as a shoe which is adapted to engage the ground and to support the wheel relative thereto. This shoe is connected to the hub 21 by means of spaced arms 34 which are integral with said shoe and hub. A web 35, connected to the arms 34 and the shoe 31, stiffen and reinforce the structure of this ground-engaging member.

The ground-engaging member 32 is part of blade 30 which includes two spaced arms 36 by means of which it is connected to the hub 21. By means of this construction, an opening 37 is formed in the said blade which serves to prevent the earth from adhering to the blade when the same leaves the ground. Fins 38 extend outwardly from the arms 36 and serve to increase the traction between the wheel and ground.

The ground-engaging member 33 is constructed similarly to the ground-engaging member 32 and is part of a blade 40. This blade includes two spaced arms 39 by means of which the ground-engaging member is connected to the hub 21. This construction provides an opening 41 in the blade 40 which, similar to opening 37, prevents the earth from adhering to the blade when the same leaves the ground. Fins 42 projecting outwardly from the arms 39 serve the same purpose as the fins 38. It will be noted in the drawings that the ground-engaging member 33 projects radially outwardly from the hub 21 a greater distance than the ground-engaging member 32.

In the construction of the invention, the openings 18 in the rim 11 are either stamped or broached to provide an arcuate surface. Likewise, the surface of the key 26 is machined to closely fit the surface of the rim 11 at the opening 18. Had the stud 23 been constructed with serrations to fit the serrations 19 of the rim 11, considerable machining would be required on each lug. By the use of the key, the machining can be readily performed on the key and the stud of the lug can be rough-cast to fit the hole in the key. When the lug wears out, the same can be replaced without the necessity of replacing the key.

The use of the invention is as follows: When the tractor is to be run over pavement or soft ground and when a minimum amount of traction is required, the lugs are assembled as shown in Fig. 7 with the shoes 31 outermost. If considerable support is required and greater traction is required, said shoes may arranged angularly by shifting the keys 26 in the holes 18. When the tractor is desired for normal use where appreciable traction is desired, the shoes are arranged as shown in Fig. 6 with the ground-engaging members 32 outermost. With this arrangement, the rim enters the ground and, likewise, the ground-engaging members 32 of the lugs 17, whereby sufficient traction is procured for the ordinary use of the tractor. If the lugs are arranged as shown in Fig. 1, with the ground-engaging members 33 outermost, the same deeply enter the ground and afford the maximum traction. At the same time, these ground-engaging members serve to break up and loosen the ground in the manner of a cultivator, to assist in tilling the soil. Due to the openings 37 and 41 formed in the blades 30 and 40, the earth is prevented from adhering to said blades and is discharged therefrom when the blades leave the ground.

The advantages of my invention are manifest. The device is extremely practical and simple in construction. Each lug may be separately adjusted with reference to the rim by manipulating a single cap-screw. The lugs are easily replaced and, in the event of breakage or wear, a lug may be replaced without renewing the key therefor, thus economizing in the maintenance of the traction wheel. With the various ground-engaging members carried on a single lug, the same are always available and ready for use, thus making it unnecessary to store different types of lugs to suit the occasion. Each ground-engaging member can be angularly adjusted with reference to the rim of the wheel, so that the same can be made to operate in the most efficient manner. With my invention, the ground-engaging members are self-cleaning, thereby preventing the accumulation of earth on the lugs and the requirement of additional power to operate the tractor.

Changes in the specific form of my invention, as herein described, may be made within the scope of what is claimed without departing from the spirit of my invention.

Having described my invention, what I claim as new and desire to protect by Letters Patent is:

1. In a traction wheel, a plate-like rim having an opening therein, the marginal portion of said rim at said opening being provided with a plurality of symmetrically arranged projections, a lug having a hub, a plurality of ground-engaging members issuing outwardly from said hub and angularly disposed relative to one another and a key acting between said hub and the projections in said rim for holding said lug from rotation and with any of the ground-engaging members in ground-engaging position.

2. In a traction wheel, a plate-like rim having an opening therein, the marginal portion of said rim at said opening being provided with a plurality of symmetrically arranged projections, a lug having a hub, a plurality of ground-engaging members issuing outwardly from said hub and angularly disposed relative to one another and a key acting between said hub and the projections in said rim for holding said lug from rotation and with any of the ground-engaging members in ground-engaging position, the number of projections in the rim being a multiple of the number of ground-engaging members on said lug.

3. In a traction wheel, a plate-like rim having an opening therein, the marginal portion of said rim at said opening being provided with a plurality of symmetrically arranged projections, a lug having a hub, a plurality of ground-engaging members issuing outwardly from said hub and angularly disposed relative to one another, a stud issuing outwardly from said hub, a key attached to said stud, said key having a number of projections thereon corresponding to the projections on said rim and adapted to cooperate therewith to hold said lug from rotation and with any of the ground-engaging members in ground-engaging position.

4. In a traction wheel, a plate-like rim having an opening therein, the marginal portion of said rim at said opening being provided with a plurality of symmetrically arranged projections, a lug having a hub, a plurality of ground-engaging members issuing outwardly from said hub and angularly disposed relative to one another, a stud issuing outwardly from said hub and having a projection thereon, a key having an opening for the reception of said stud, and having a projection adapted to engage the projection of the stud to prevent rotation therebetween, said key having a number of projections thereon corresponding to the projections on said rim and adapted to cooperate therewith to hold said lug from rotation and with any of the ground-engaging members in ground-engaging position.

5. In a traction wheel, a plate-like rim having an opening therein, the marginal portion of said rim at said opening being provided with a plurality of symmetrically arranged projections, a lug having a hub, a plurality of ground-engaging members issuing outwardly from said hub and angularly disposed relative to one another, a stud of non-circular cross-section extending outwardly from said hub, a key having a hole therein and conforming in configuration to that of said stud and adapted to receive the same, and held from rotation relative thereto, said key having a number of projections thereon corresponding to the projections on said rim and adapted to cooperate therewith to hold said lug from rotation and with any of the ground-engaging members in ground-engaging position.

6. In a traction wheel, a rim having a transverse opening therein, a lug having a hub, a plurality of ground-engaging members issuing outwardly from said hub and angularly disposed relative to one another, a stud issuing outwardly from said hub and having a projection thereon, a key attached to said stud and having a projection adapted to engage the projection of the stud, said key being receivable in the opening in said rim, said rim and key having engaging parts, one of said parts having a plurality of symmetrically arranged projections, and a projection on the other part adapted to engage any of the first-named projections, to hold the lug from rotation with any of the ground-engaging members in ground-engaging position.

7. In a traction wheel, a rim, a lug having a hub, a pair of arms issuing outwardly from said hub in spaced relation to one another, a blade connected to asid arms at their outer ends and wings projecting laterally from said arms and lying in substantially the same plane as said blade and means for securing the hub to the rim.

NELS H. NELSON.